(12) United States Patent
Schlepp

(10) Patent No.: US 6,926,513 B2
(45) Date of Patent: Aug. 9, 2005

(54) SYSTEM FOR MINIMIZING PLATEN DRIVE SHAFT FLEX IN A THERMOFORMING PRESS

(75) Inventor: Brian D. Schlepp, Yakima, WA (US)

(73) Assignee: Thermoforming Systems, LLC, Yakima, WA (US)

(*) Notice: Subject to any disclaimer, the term of this patent is extended or adjusted under 35 U.S.C. 154(b) by 125 days.

(21) Appl. No.: 10/460,889

(22) Filed: Jun. 12, 2003

(65) Prior Publication Data
US 2004/0250709 A1 Dec. 16, 2004

(51) Int. Cl.⁷ .............................................. B29C 51/18
(52) U.S. Cl. ...................... 425/394; 100/282; 425/451.6
(58) Field of Search ................................. 425/394, 398, 425/451.6; 100/282

(56) References Cited

U.S. PATENT DOCUMENTS

| | | | | |
|---|---|---|---|---|
| 3,876,361 A | * | 4/1975 | Irwin | 425/451.6 |
| 4,088,432 A | * | 5/1978 | Farrell | 425/451.6 |
| 4,377,377 A | * | 3/1983 | Arends et al. | 425/394 |
| 4,608,009 A | * | 8/1986 | Whiteside et al. | 425/451.6 |
| 4,673,347 A | * | 6/1987 | Ziegler | 425/451.6 |
| 5,002,479 A | * | 3/1991 | Brown et al. | 425/398 |
| 5,123,834 A | * | 6/1992 | Joyner | 425/451.6 |
| 6,200,122 B1 | * | 3/2001 | Chun et al. | 425/451.6 |
| 6,314,873 B1 | * | 11/2001 | Lee et al. | 425/398 |

* cited by examiner

Primary Examiner—James P. Mackey
(74) Attorney, Agent, or Firm—Stratton Ballew PLLC

(57) ABSTRACT

A system for minimizing platen drive shaft flex in a thermoforming press employed in a thermoforming process is provided. The thermoformer press molds plastic sheets into finished articles. The system minimizes rotational vibrations in a platen drive shaft that actuates the thermal press. Reenforcing plates, or doubler plates, are added as auxiliary frame members, to reduce flex in the platen drive shaft. The doubler plates support the drive shaft along the length of the shaft. The doubler plates include bearings positioned proximate to linkages. The linkages interconnect the drive shaft and the platens. The doubler plates are preferably positioned proximate to the linkages, on the drive shaft and opposite frame bearings. The system can include yoked pivots to support both sides of bearings in the linkages between the drive shaft and the platen. The yoked supports evenly transmit forces between the platen drive shaft to the platens. Preferably, the system minimizing platen drive shaft flex is free of counterbalancing elements in the linkages between the drive shaft and the platens.

9 Claims, 6 Drawing Sheets

SYSTEM FOR MINIMIZING PLATEN DRIVE SHAFT FLEX IN A THERMOFORMING PRESS

TECHNICAL FIELD

The invention relates to minimizing rotational vibrations in a drive shaft that actuates a thermal press, the thermal press employed in a thermoforming process. More particularly, the invention relates to a system for reducing flex in the platen drive shaft that rotates to actuate a thermoformer platen, and a corresponding beneficial alignment of linkages, to actuate the platen.

BACKGROUND OF THE INVENTION

The continuous sheet thermoforming of synthetic plastic articles is a widely utilized industrial process. Thermoformers can take a variety of configurations, but each type includes the same basic stations. The plastic raw material is utilized in rolls or precut sheets. Common thermoformers include rotary machines, single stage devices, or as preferred for the purposes of the present invention, an in-line, continuous sheet thermoformer.

At the feed end of the in-line thermoforming process, a thin sheet of plastic is positioned at an in-feed or loading station. The loading station may receive the plastic sheet directly from an extruder, or from a rolled sheet of material. The thin plastic sheet is fed continuously, from the loading station to a heating station and then to a forming station. At the heating station the sheet is heated to the required forming temperature. In the forming station the sheet is deformed or molded into the desired shape. This forming is accomplished by direct compression or differential pressure forces, or a combination of these forces to fit the shape of the mold within the former.

For the thermoforming process, the sheet of thermoplastic material is heated until it becomes soft and pliable, but not fluid. The heated sheet is briefly held within the mold of the thermoforming press for forming.

Thermoforming systems with reciprocating platens suffer from slight off-cuts in the thermoformed articles produced, stemming from flexing related oscillations of the platen drive shaft. Flexing of the platen drive shaft translates to positional variation in the platen, and so in variation in the shape of the thermoformed article. Typically, the thermoformed article is manufactured to narrow tolerances.

The thickness of walls in a plastic cup, for example, must be thin to minimize the material required for the cup, but still must be thick enough to provide strength to the cup. A thousandths of an inch difference can result in a rejected cup, or in a cup failure. Consistency and precision are required in the manufacture of thermoformed articles, to maintain the desired precision at the high speeds required of modem thermoforming systems. Flex in the platen drive shaft is a limiting factor in attaining higher production rates.

The actuating linkages for thermoforming presses are typically complex and involve large forces that must be translated in an even and smooth mechanism in a high speed cycle. The inventors of the present invention observed that the standard, "sea saw" counterbalanced actuation of in-line thermoforming presses resulted in slight misalignment or registry errors that could not be compensated for, because these misalignments were inherent in the counterbalance system of platen drives.

A primary cause of these alignment errors are unwanted "moment arms" or extra-rotational forces on the platen drive shaft. These moment arms, if not offset or adequately reduced, alter the rotational motions of axial drive shafts that provided the force to raise and lower the platens in a reciprocating relationship. These misalignments are a larger problem at higher press operation speeds and under higher molding pressures, as required for thicker materials, cooler operating temperatures and faster press speeds.

U.S. Pat. No. 6,314,873 discloses a method for operating a thermoforming press that include the use of a "counter force assembly" 140, described therein as used to exert a counter force against the drive shaft of the thermoforming press and minimize deflection. The counter force assembly is shown in FIGS. 3, 4, 5A, 5B and 7, therein. The counteracting element of the '873 thermoforming press functions well and is a great advantage in reducing misalignments due to shaft flex over prior, in-line presses.

A new system of press operation is needed that minimized these alignment errors in the operation of a thermal press. The present invention addresses these operational alignment problems and provides a new system of thermoforming press operation. The aspects and advantages of the invention will become apparent from consideration of the following figures and description.

DETAILED DESCRIPTION OF SPECIFIC EMBODIMENTS

The present invention includes a system for reducing flex in a drive shaft of a reciprocating platen. Specifically, the reciprocating platen is a thermoformer platen, as employed in an in-line thermoforming process. A preferred embodiment of the system of the present invention is shown in FIGS. 1 through 6. The present invention is employed in a thermoforming press, as shown in FIGS. 1 through 3 and 5. The thermoforming press 15, alternatively referred to herein as a "press," includes a frame 20, which serves as a static anchor and mount for the moving components of the press.

As shown in FIGS. 1 through 3, 5 and 6, the system of flex reduction, includes reenforcing plates referred to herein as "doubler" plates 22. The doubler plates are auxiliary frame members, preferably formed of metal plate, and most preferably of the same high tensile strength steel of the frame 20. The doubler plates must be of an adequate thickness to resist deflection, and are preferably welded into the frame. However other conventional means of attachment are considered, such as manufacturing the frame in a unitary design that includes the doubler plates, or bolting the doubler plates to the frame. Additionally, other alloys are considered as possible materials for the frame and doubler plates, as are known to those skilled in the technology of metal fabricating and machining in heavy duty equipment manufacture.

Figure 3:
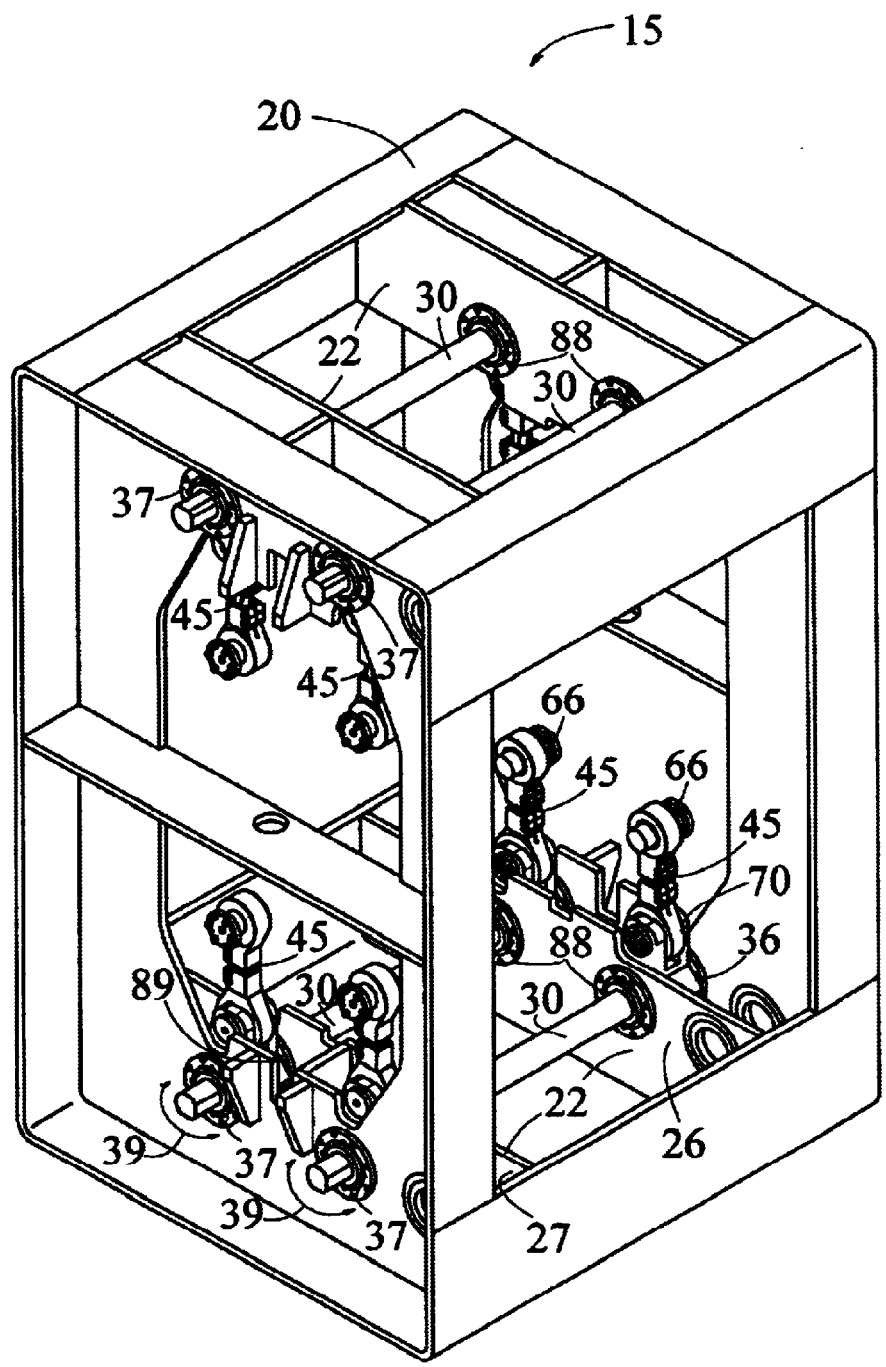
FIG. 3 is a partial isometric view of a thermoforming press with a platen drive shaft flex reducing system, according to an embodiment of the invention.

In a preferred embodiment of the present invention, as shown in FIG. 3, a pair of doubler plates 22 are employed. Specifically a first doubler plate 26 and a second doubler plate 27 are each positioned along a platen drive shaft 30, also referred to herein as a "drive shaft," to dampen vibrational flex in the platen drive shaft as it rotates. However, to reduce partially, this flex along the platen drive shaft, a single doubler plate could be utilized.

With the doubler plates 22 immovably mounted within the frame, each doubler plate receives the platen drive shaft within a doubler bearing 33. The doubler bearing is a standard, high-torque axle or shaft bearing. The doubler bearing is selected for a high tolerances of manufacture with a minimum of supra-rotational movement or "slop," and a long service life. A preferred bearing is the "Quadralube" brand of spherical bearing, as manufactured by RBC, Inc. of U.S.A.

Again, the immovable mounting of the doubler plates 22 within the frame 20 can be any means of fastening as typically employed to secure such a member to the frame, but welding is the preferred attachment method. However, screws could also be employed alone or in addition to the welded attachment of the doubler plate. Also, alternatively, the frame could be made of unitary or "formed" components. Therefore, the doubler plate, as an integral part of the frame, could be cast, forged or cold rolled of the same contiguous structure as the frame, or simply bent into place from a frame member. Most preferably, to dampen vibration best in operation of the thermoforming press 15, the frame is manufactured of heavy gauge steel plate, with a channeled member construction joined by fully welded seams.

Figure 1:
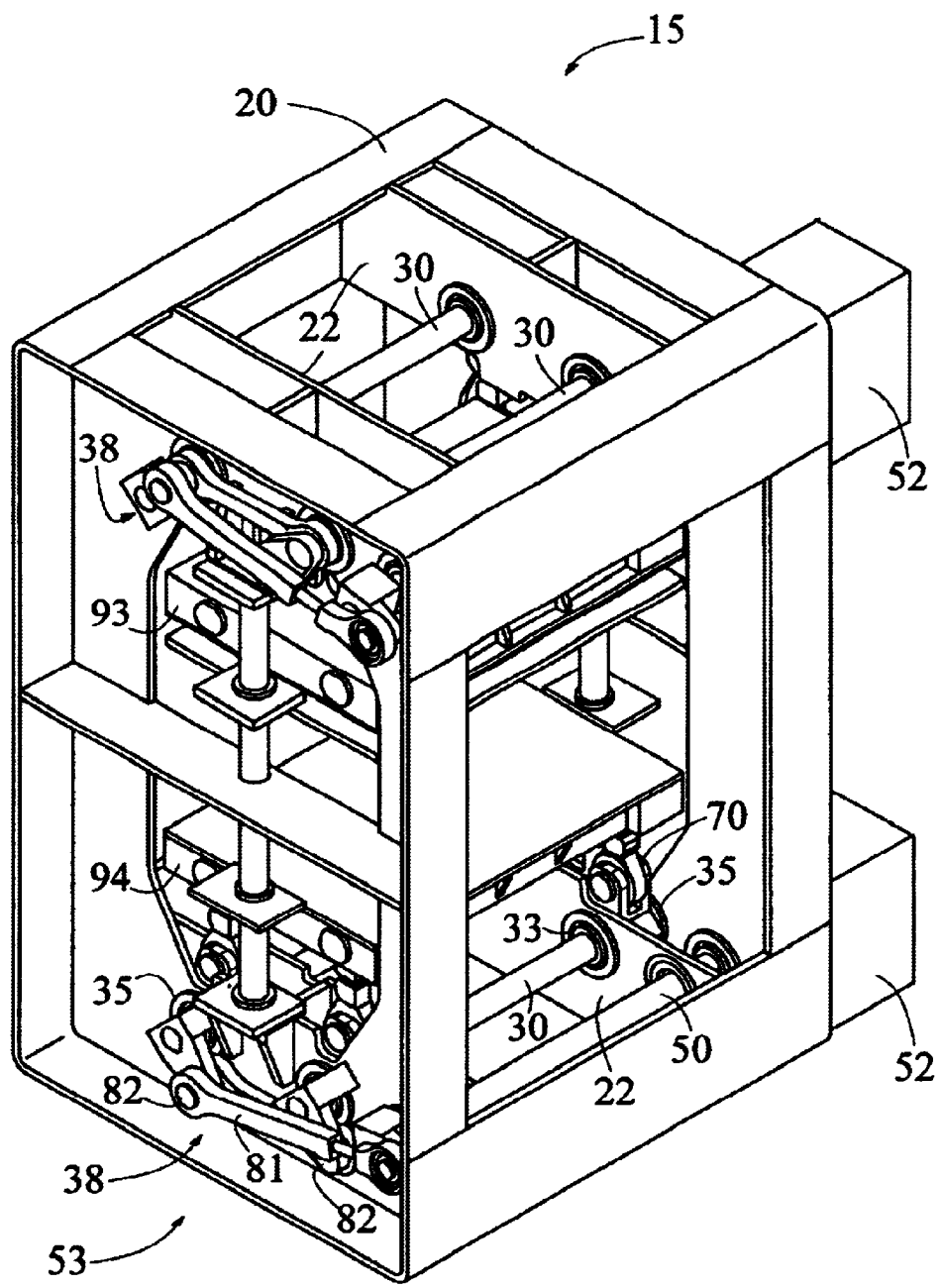
FIG. 1 is an isometric view of a thermoforming press with a platen drive shaft flex reducing system, according to an embodiment of the invention.
Figure 2:
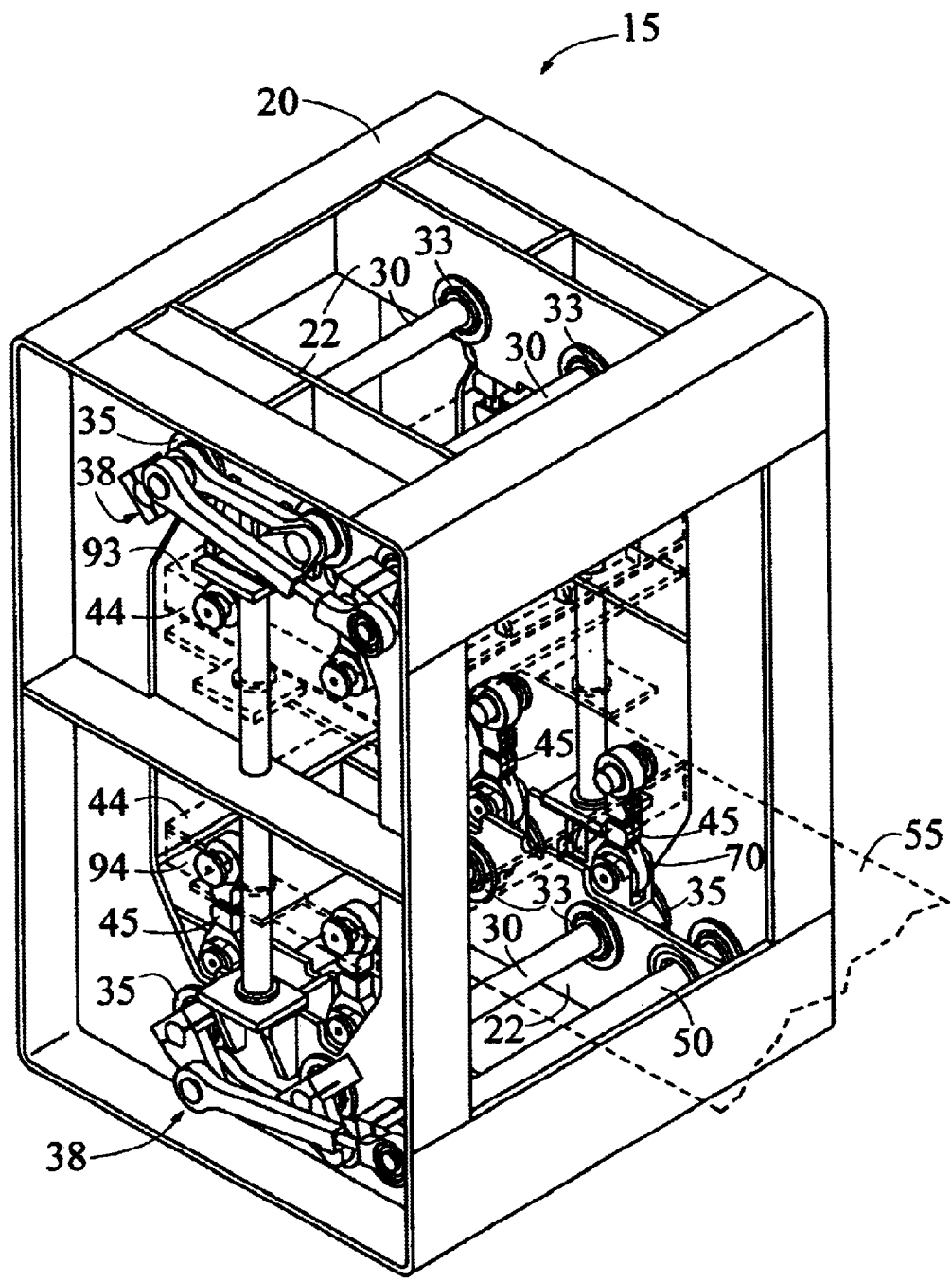
FIG. 2 is a partially hidden line isometric view of a thermoforming press with a platen drive shaft flex reducing system, according to an embodiment of the invention.

The platen drive shaft 30 is primarily supported at each end within the frame 20 by a frame bearing 35, and so the drive shaft spans the frame between a first frame bearing 36 and a second frame bearing 37, as shown in FIGS. 1 through 3. The drive shaft is also received into the doubler bearing 33. The platen drive shaft rotates freely within the doubler bearing and the frame bearing. However, the doubler bearing in cooperation with the frame bearing maintains the platen drive shaft precisely in position, without any movement or "play." And so, the doubler plate supports the platen drive shaft to minimize oscillations, deflection or "flex" along the shaft. The doubler bearing of the doubler plate only allows the desired, axial rotational motion of the platen drive shaft. The platen drive shaft may be referred to herein as simply the "drive shaft."

The platen drive shaft 30 mounts within the frame 20, as shown in FIGS. 1 through 3. The platen drive shaft is rotated by the cranking action of a drive linkage 38. The drive linkage rotates the platen drive in a partial arc 39. The partial arc is approximately 180 degrees, or as required to lower and raise a platen 44. A platen linkage 45 connects the platen drive shaft to the platen, and so the rotation of the platen drive actuates the platen linkage to raise and lower the platen.

The drive linkage 38 is actuated by the rotating of a power drive shaft 50. As shown in FIG. 1, a drive motor 52 rotates the power drive shaft. The drive linkage serves to convert the rotational action of the power drive shaft into a reciprocating, back-and-forth motion of the platen drive shaft 30. The drive motor, the power drive shaft and the drive linkage together form a drive mechanism 53. The partial rotation of the platen drive shaft actuates the platen linkage 45, which raises and lowers the platen 40.

For the present invention, the platen 40 is specifically a thermoformer platen for die-forming a sheet of plastic material 55. The platen is movably mounted within the frame 20. In a high speed reciprocating motion, the platen forms a preheated sheet of the plastic material into a thermoformed article having any conventional shape. An advantage of the present invention is realized by the increased accuracy of the die cutting of the thermoformed sheet by the platen as a result of the flex reduction system employing the doubler plates 22.

The platen 40 is directly actuated by the platen linkage 45. Each platen linkage has a platen end 61 and a drive end 62. As shown in FIG. 2, the platen end of the platen linkage, hingably attaches to the platen at a platen pivot 66. The drive end of the platen linkage hingably attaches to the drive shaft at a drive pivot 67. The drive pivot is located adjacent to the platen drive shaft 30, between the first frame bearing 36 and the doubler bearing 33.

Figure 6:
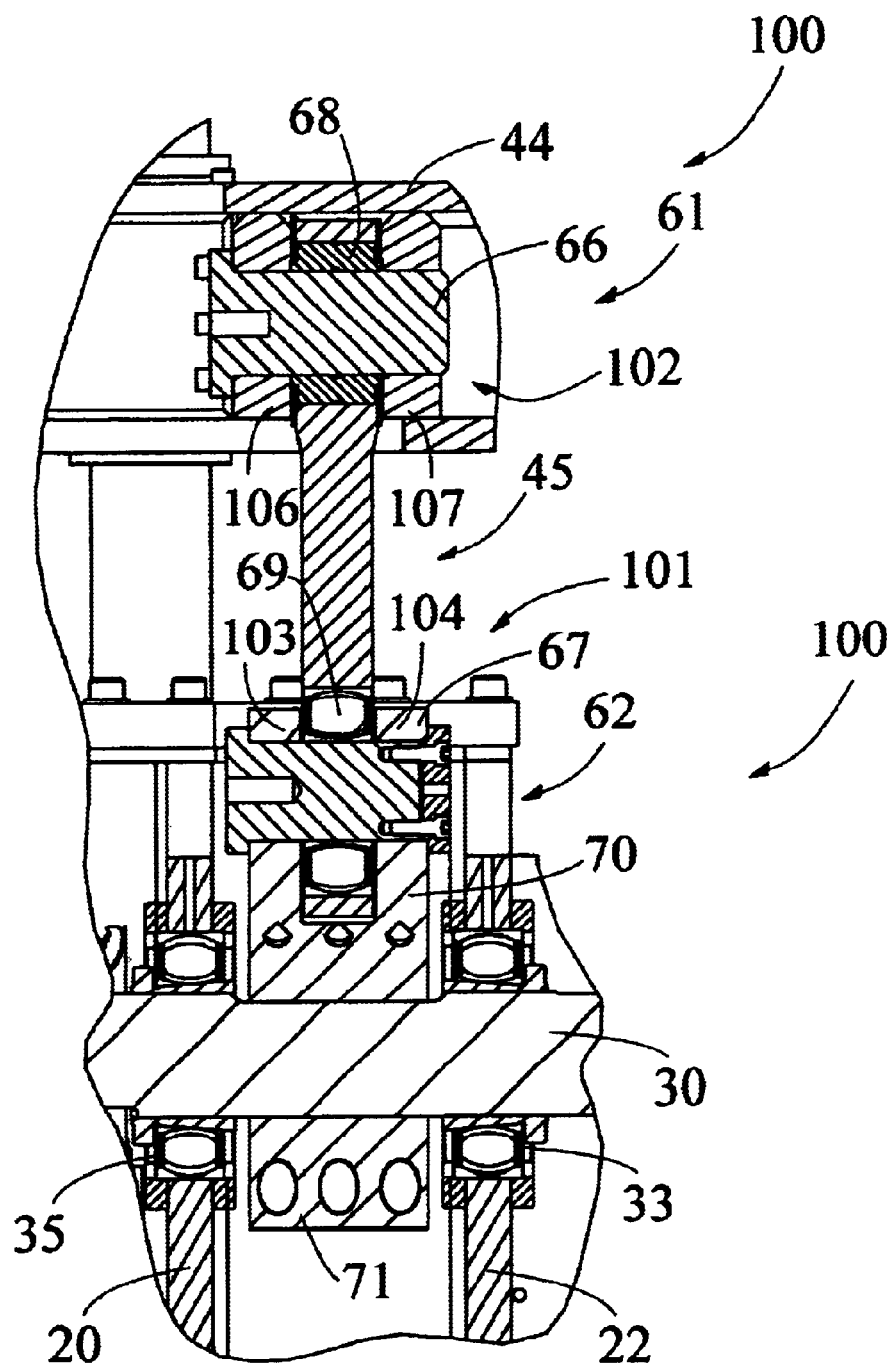
FIG. 6 is a partially sectioned side elevation view of a thermoforming press with a platen drive shaft flex reducing system, which is a detail of area 6 noted in FIG. 5, according to an embodiment of the invention.

As shown in FIG. 6, the platen pivot 66 preferably includes a platen pivot bearing 68, which provides a rotatable connection between the platen 40 and the platen linkage 45. At the opposite end of the platen linkage 45, the drive pivot preferably includes a drive pivot bearing 69, for a rotatable connection between the platen linkage and the drive pivot.

Figure 4:
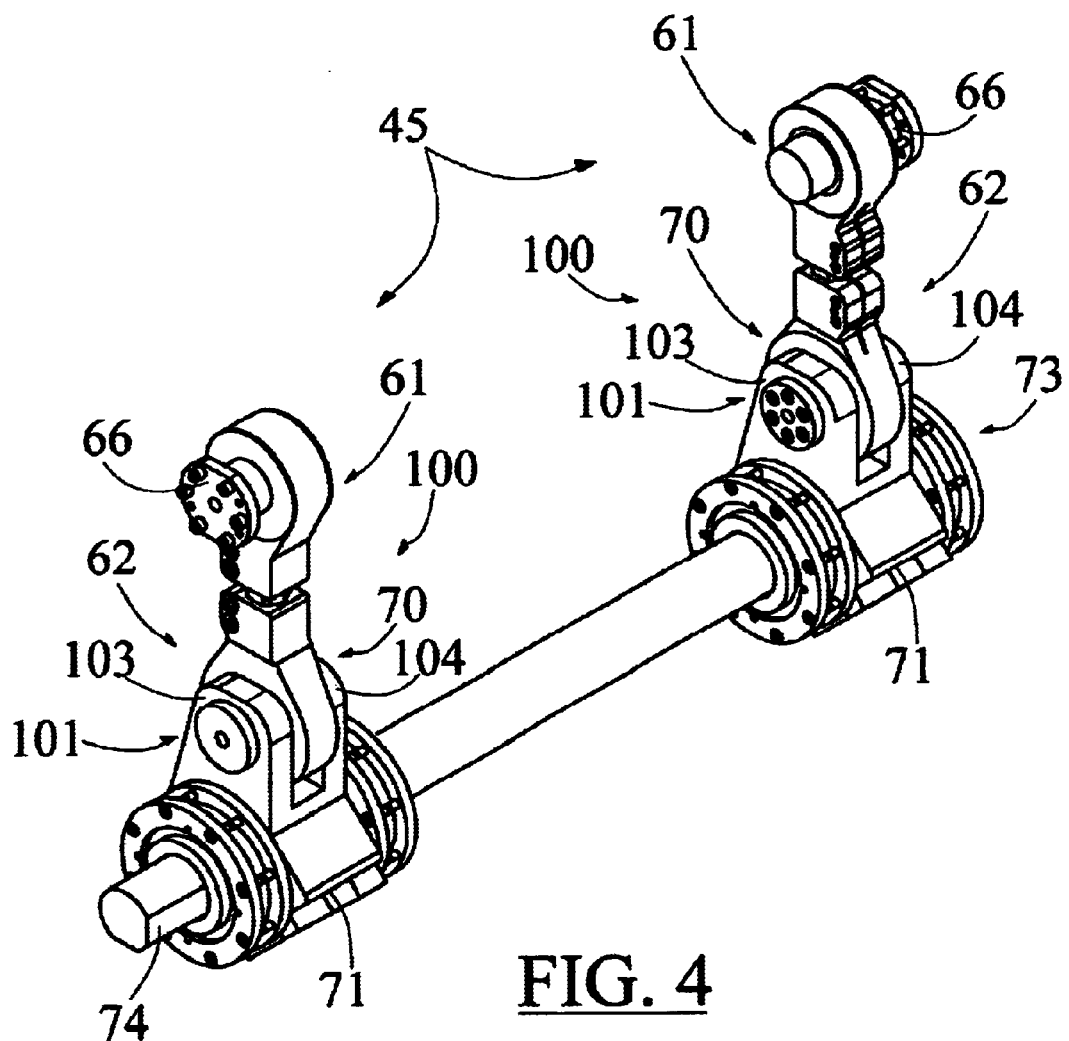
FIG. 4 is an isometric view of a portion of a thermoforming press with a platen drive shaft flex reducing system, according to an embodiment of the invention.

Most preferably, the drive pivot 67 includes a toggle 70. The toggle mounts to the platen drive shaft 30 and essentially acts as an armature. The toggle translates the partial arc 39, rotational motion of the platen drive shaft to the reciprocating, up and down motion needed for movement of the platen 44. The toggle is immovably and firmly mounted to the platen drive shaft at a drive pivot attachment 71. As is generally conventional for armatures, a clamping design is utilized for the drive pivot attachment, as shown in FIG. 4, to grasp the platen drive shaft firmly.

By placing the toggle 70 between the frame 20 the doubler plate 22, flexing of the platen drive shaft 30 is minimized. Specifically, the toggle is sandwiched, in close proximity, by the frame bearing 35 and the doubler bearing 33 for direct support of the platen drive shaft. By minimizing flex in the platen drive shaft, undesirable deflection or "extra-rotational" motion of the platen linkage 45, which would be directly transferred to the platen 44, is also minimized or eliminated.

As discussed in the background section above, prior thermoforming systems that employ reciprocating platens suffer from slight off-cuts in the thermoformed articles produced. These off-cuts or misalignments, often stem from flexing related oscillations of the platen drive shaft 30. The flexing of the platen drive shaft translates to positional variation in the platen 44, and so in variation in the shape the thermoformed article 56. A high degree of consistency and precision are required in the manufacture of thermoformed articles, to maintain the desired precision at the high speeds required of modem thermoforming systems. Flex in the platen drive shaft is a limiting factor in attaining higher production rates. The doubler plate 22 reduces the flex of the drive shaft as the platen linkage moves the thermoforming platen within the frame 20.

The platen drive shaft 30 has a first shaft end 73 and a second shaft end 74. The first shaft end is received into the frame 20 at the first frame bearing 36, and the second shaft end is received into the frame at a second frame bearing 37. As preferred and shown in FIGS. 1 through 4, the drive linkage 38 hingably mounts to the first shaft end, proximate to the first frame bearing. As shown in FIG. 1, each drive linkage preferably includes a drive linkage arm 81 and a drive linkage toggle 82. The power drive shaft 50 actuates the drive linkage to rotate the platen drive shaft.

As shown in FIGS. 1 through 3 and 5, the doubler plates 22 are preferably utilized in pairs, and a most preferable embodiment of the present invention includes a first doubler plate 86, and a second doubler plate 87. The first doubler plate has a first doubler bearing 88, and the second doubler plate has a second doubler bearing 89.

As shown in FIGS. 1 through 3 and 5, the platen 44 can be an upper platen 93, or a lower platen 94. The platens are preferably utilized in pairs, with one platen contacting the heated, sheet of plastic material 55 from one side, while the second platen contacts the sheet from the other side. The platens reciprocate in unison to contact and form the thermoformed article 56 or plurality of articles from the sheet of thermoplastic material.

The lower platen 94 is driven by the action of a lower platen drive mechanism 96, which includes the platen drive shaft 30 and the platen linkage 45, serving the lower platen, as shown in FIG. 2. Similarly, the upper platen 93 is driven by an upper platen drive mechanism 98, which includes the platen drive shaft and the platen linkage, serving the lower platen, as also shown in FIG. 2. Each platen linkage includes the toggle 70, attached to the platen drive shaft 30, and the platen pivot 66, attached to the platen 44.

Both the upper platen 93 and the lower platen 94 can utilize the doubler plates 22 of the present invention to minimize flex in their respective platen drive shafts 30. Most preferably, the lower platen is actuated by two lower platen drive mechanisms 96, to provide a balanced reciprocating force to the lower platen. Similarly, the upper platen is actuated by two upper platen drive mechanisms 98, to provide a balanced, reciprocating force to the upper platen.

Figure 5:
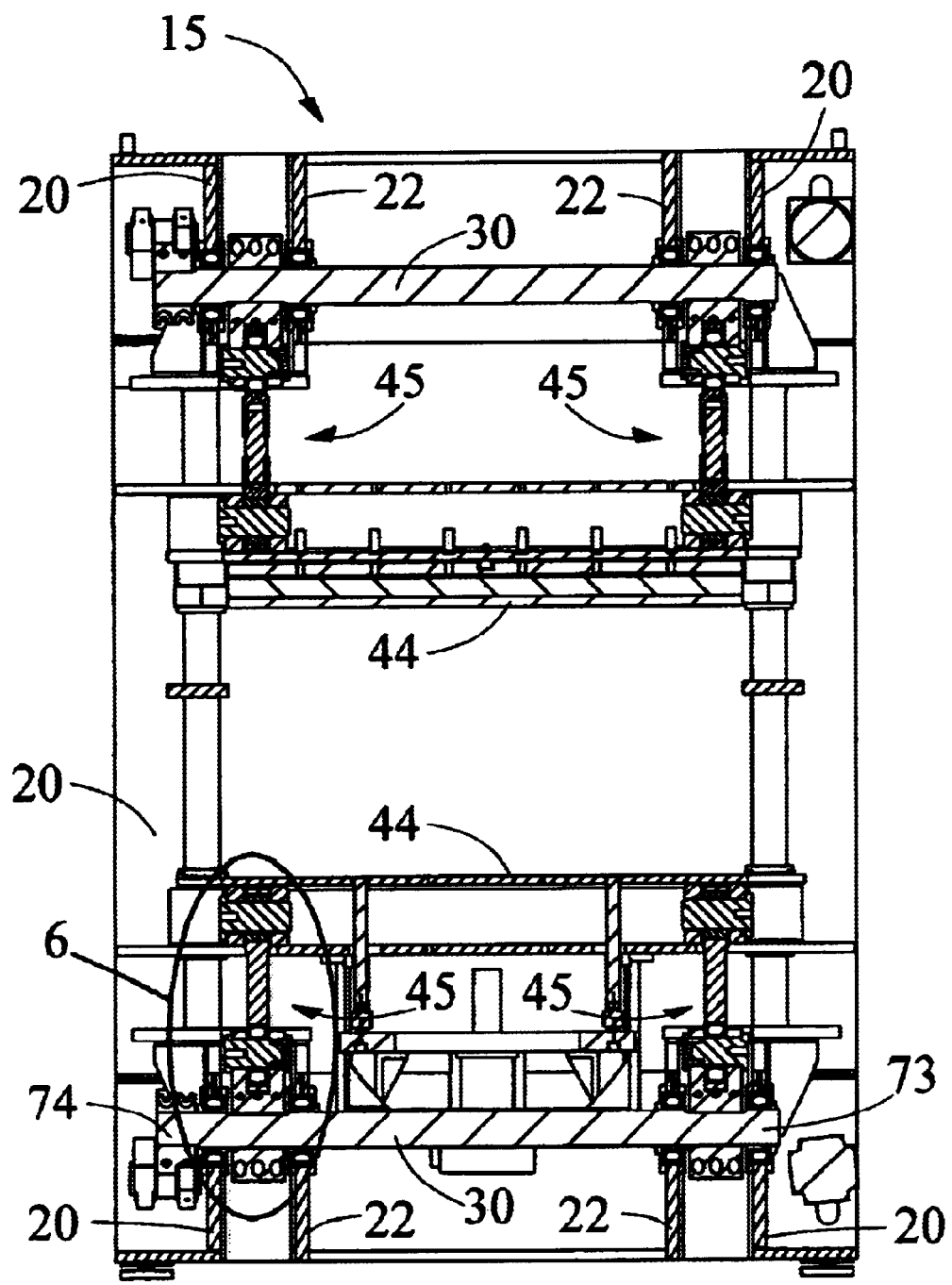
FIG. 5 is a partially sectioned side elevation view of a thermoforming press with a platen drive shaft flex reducing system, according to an embodiment of the invention.

FIG. 5 shows a partially sectioned elevation of the thermoforming press 15, with the doubler plates 22 of the present invention. FIG. 6 is the detail 6 of FIG. 5, and depicts the bearing and pivot structure of the doubler plates and the linear platen linkage 45, which includes the toggles 70, free of counterbalancing elements. These counterbalancing elements were necessary components of the prior art methods cited herein.

A significant advantage of the present invention is that each toggle 70 of the platen linkage 45 is mounted in a substantially linearly supported alignment, eliminating the side-to-side forces typically encountered due to conventional crank and pivot designs used with prior thermoforming presses. The present invention preferably employs a system of yoked pivots 100, which includes support on both sides of the bearings along the platen linkage, to transmit forces from the platen drive shaft 30 to the platens 44 evenly.

Specifically, the system of yoked pivots 100 preferably include a drive pivot yoke 101, and a platen pivot yoke 102, as shown in FIG. 6. The drive pivot yoke is an element of the toggle 70, and receives the drive end 62 of the platen linkage 45. The platen pivot yoke is an element of the platen 44, and receives the platen end 61 of the platen linkage.

As detailed in FIG. 6, the drive pivot yoke 101 includes a first drive pivot yoke flange 103, and a second drive pivot yoke flange 104. The drive pivot bearing 69 is received between the first drive pivot yoke flange and the second drive pivot yoke flange. The first drive pivot yoke flange and the second drive pivot yoke flange effectively "sandwich" the drive pivot bearing. Forces are evenly transferred to and from the drive pivot 67, which is the connection between the toggle 70 and the platen linkage 45, without twisting, off-center forces or "moments."

Similarly, as also detailed in FIG. 6, the platen pivot yoke 102 includes a first platen pivot yoke flange 106, and a second platen pivot yoke flange 107. The platen pivot bearing 68 is received between the first drive pivot yoke flange and the second drive pivot yoke flange, and so, the first platen pivot yoke flange and the second platen pivot yoke flange sandwich the platen pivot bearing. Forces are evenly transferred to and from the platen pivot 66, which is the connection between the platen linkage 45 and the platen 44, without twisting, off-center moments.

Therefore, with the system of yoked pivots 100, forces along the platen linkages 45 are maintained at a "normal," or perpendicular orientation to the platen drive shaft 30, without off-center moments of force. This normal alignment is a direct advantage, gained by the flex reduction system of the present invention. With the additional use of the doubler plates 22, the system of yoked pivots provides the supplemental support necessary to provide a direct alignment of forces, transferred along the platen linkage to the toggles 70, and so to the drive shaft.

In an alternative embodiment of the flex reduction system of the present invention, a thermoforming press 15 including any multiple of the drive mechanisms 53, platen drive shafts 33, platen linkages 45, and platens 44 can be employed.

In another preferred embodiment of the present invention, a single doubler plate 22 could serve a pair of toggles 70, each mounted to the platen drive shaft 33. In this embodiment, the functions of the first doubler plate 26 and the second doubler plate 27 are combined, with the doubler bearing 33 located on the drive shaft, proximate to the midpoint between the toggles of the platen linkages 45.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited but by the following claims, as appropriately interpreted by the doctrine of equivalents.

The following is claimed:

1. A flex reduction system for use with a drive shaft of a thermoformer platen, the flex reduction system comprising:

the thermoformer platen movably mounted within a frame;

the drive shaft rotatably mounted within the frame, the drive shaft having a first shaft end and a second shaft end, the first shaft end received into the frame at a first frame bearing, and the second shaft end received into the frame at a second frame bearing;

a doubler plate immovably mounted within the frame, the doubler plate having a doubler bearing, and the drive shaft received into the doubler bearing;

a linkage, the linkage having a platen end and a drive end, the platen end hingably attached to the thermoformer platen at a platen pivot, and the drive end hingably attached to the drive shaft at a drive pivot, the drive pivot located on the drive shaft between the first frame bearing and the doubler bearing; and the doubler plate reduces the flex of the drive shaft as the linkage moves the thermoforming platen within the frame in a reciprocating motion, the linkage driven by the rotation of the drive shaft.

2. The flex reduction system of claim 1, wherein;

the doubler plate is a plurality of doubler plates, each of the doubler plates immovably mounted within the frame;

the linkage is a plurality of linkages, each of the linkages including a platen end and a drive end, the platen end hingably attached to the thermoformer platen at a platen pivot;

the drive shaft received into each of the doubler bearings of each of the plurality doubler plates;

the drive pivot is a plurality of drive pivots, each of the drive pivots located on the drive shaft supported by an adjacent doubler bearing of at least one of the plurality of doubler plates; and each of the plurality of doubler plate reduces the flex of the drive shaft as the linkages moves the thermoforming platen within the frame in a reciprocating motion, the linkage driven by the rotation of the drive shaft.

3. The flex reduction system of claim 1, wherein;

the drive pivot includes a toggle, the toggle including a drive pivot attachment and a linkage pivot, the drive shaft immobile within the drive pivot attachment, and the linkage pivot hingably attached to the drive end of the linkage; and the toggle rotatable on the drive shaft without a counteracting element attached to the toggle.

4. The flex reduction system of claim 1, wherein;

the drive pivot includes a toggle and a drive pivot bearing, the toggle immovably attached to the drive shaft at a drive pivot attachment, and the drive pivot hingably attached to the drive end of the linkage;

the toggle includes a first drive pivot yoke flange, and a second drive pivot yoke flange;

the drive pivot bearing received between the first drive pivot yoke flange and the second drive pivot yoke flange; and the drive pivot operational to maintain substantially linear moments of force transferred between the thermoformer platen and the drive shaft.

5. The flex reduction system of claim 1, wherein;

the platen pivot includes a platen pivot bearing, the platen pivot hingably attached to the platen end of the linkage;

the platen includes a first platen pivot yoke flange, and a second platen pivot yoke flange;

the platen pivot bearing received between the first platen pivot yoke flange and the second platen pivot yoke flange; and the platen pivot operational to maintain substantially linear moments of force transferred between the thermoformer platen and the drive shaft.

6. An apparatus for reducing a flex in a drive shaft of a thermoformer platen, the apparatus comprising:

the thermoformer platen movably mounted within a frame;

the drive shaft rotatably mounted within the frame, the drive shaft having a first shaft end and a second shaft end, the first shaft end received into the frame at a first frame bearing, and the second shaft end received into the frame at a second frame bearing;

a first doubler plate immovably mounted within the frame, the first doubler plate having a first doubler bearing, and the drive shaft received into the first doubler bearing;

a first linkage, the first linkage having a first platen end and a first drive end, the first platen end hingably attached to the thermoformer platen at a first platen pivot, and the first drive end hingably attached to the drive shaft at a first drive pivot, the first drive pivot located between the first frame bearing and the first doubler bearing on the drive shaft;

a second doubler plate immovably mounted within the frame, the second doubler plate having a second doubler bearing, and the drive shaft received into the second doubler bearing;

a second linkage, the second linkage having a second platen end and a second drive end, the second platen end hingably attached to the thermoformer platen at a second platen pivot, and the second drive end hingably attached to the drive shaft at a second drive pivot, the second drive pivot located between the second frame bearing and the second doubler bearing on the drive shaft; and the first doubler plate and the second doubler plate together reduce the flex of the drive shaft as the first linkage and the second linkage moves the thermoforming platen within the frame in a reciprocating motion, the first linkage and the second linkage driven by the rotation of the drive shaft.

7. The flex reduction apparatus of claim 6, wherein;

the first drive pivot includes a first toggle and a first drive pivot bearing, the first toggle immovably attached to the drive shaft at a first drive pivot attachment, and the first drive pivot hingably attached to the first drive end of the first linkage;

the first toggle includes a first toggle first drive pivot yoke flange, and a first toggle second drive pivot yoke flange;

the first drive pivot bearing received between the first toggle first drive pivot yoke flange and the first toggle second drive pivot yoke flange;

the second drive pivot includes a second toggle and a second drive pivot bearing, the second toggle immovably attached to the drive shaft at a second drive pivot attachment, and the second drive pivot hingably attached to the second drive end of the second linkage;

the second toggle includes a second toggle first drive pivot yoke flange, and a second toggle second drive pivot yoke flange;

the second drive pivot bearing received between the second toggle first drive pivot yoke flange and the second toggle second drive pivot yoke flange; and the first drive pivot and the second drive pivot operational to maintain substantially linear moments of force transferred between the thermoformer platen and the drive shaft.

8. The flex reduction apparatus of claim 6, wherein;

the first platen pivot includes a first platen pivot bearing, the first platen pivot hingably attached to the first platen end of the first linkage;

the first platen includes a first platen first platen pivot yoke flange, and a first platen second platen pivot yoke flange;

the first platen pivot bearing received between the first platen first platen pivot yoke flange and the first platen second platen pivot yoke flange;

the second platen pivot includes a second platen pivot bearing, the second platen pivot hingably attached to the second platen end of the second linkage;

the second platen includes a second platen first platen pivot yoke flange, and a second platen second platen pivot yoke flange;

the second platen pivot bearing received between the second platen first platen pivot yoke flange and the second platen second platen pivot yoke flange; and the first platen pivot and the second platen pivot operational to maintain substantially linear moments of force transferred between the thermoformer platen and the drive shaft.

9. The flex reduction apparatus of claim 6, wherein;

the first drive pivot includes a first toggle, the first toggle includes a first drive pivot attachment and a first linkage pivot, the drive shaft immobile within the first drive pivot attachment, and the first linkage pivot hingably attached to the first drive end of the first linkage;

the first toggle rotatable on the drive shaft without a first counteracting element attached to the first toggle;

the second drive pivot includes a second toggle, the second toggle including a second drive pivot attachment and a second linkage pivot, the drive shaft immobile within the second drive pivot attachment, and the second linkage pivot hingably attached to the second drive end of the second linkage; and the second toggle rotatable on the drive shaft without a second counteracting element attached to the second toggle.

* * * * *